United States Patent Office 3,592,821
Patented July 13, 1971

---

3,592,821
2-(2′-HYDROXY-3′,5′-DICHLOROPHENYL)-5-CHLO-RO- OR 5-METHYLBENZIMIDAZOLES
Max Schellenbaum, Muttenz, and Max Duennenberger, Frenkendorf, Switzerland, assignors to CIBA Limited, Basel, Switzerland
No Drawing. Filed May 21, 1968, Ser. No. 730,944
Int. Cl. C07d 49/38
U.S. Cl. 260—309.2
3 Claims

ABSTRACT OF THE DISCLOSURE

2 - (2′ - hydroxy - 3′,5′ - dichloro - phenyl) - 5 - chloro - or methylbenzimidazoles useful for combating harmful microorganisms.

---

The present invention provides the new benzimidazole compounds of the formula (1)
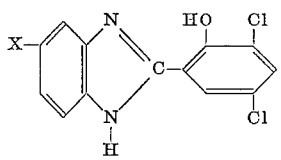

in which X represents a chlorine atom or a methyl group.

These compounds, namely the 2-(2′-hydroxy-3′,5′-dichlorophenyl)-5-chlorobenzimidazole of the formula (2)
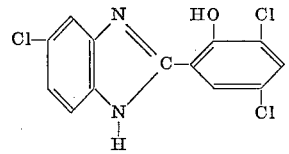

and the 2-(2′-hydroxy-3′,5′-dichlorophenyl)-5-methyl-benzimidazole of the formula (3)
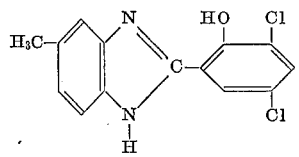

are accessible by known methods, for example by reacting 4-chloro- or 4-methyl-1,2-diaminobenzene with 2-hydroxy-3,5-dichloro-1-benzoic acid or a reactive derivative of this acid, with direct formation of the imidazole ring or with intermediate formation of the corresponding mono - (hydroxydichlorobenzoyl) - diaminochlorobenzene or -methylbenzene. When the two requisite starting products in about equimolecular proportions are heated in polyphosphoric acid for some time at about 200° C., the benzimidazoles are obtained directly; they are easy to isolate from the reaction mixture and can, if desired, by purified by recrystallization.

The compounds of the Formula 1 and especially that of the Formula 2 may be used for combating harmful microorganisms, the preparations for combating harmful microorganisms being manufactured with these benzimidazoles and used in known manner. A specially valuable feature of the new agents is their broad antibacterial activity spectrum including both Gram-positive and Gram-negative bacteria.

The new benzimidazoles are odourless and this is of special value to their application. Accordingly, the invention includes also their use in pest control quite generally. The new compounds may be used on a very broad basis, especially for protecting organic substrates from infestation by destructive and pathogenic (including phytopathogenic) microorganisms. The new benzimidazoles may therefore also be used as preservatives and as disinfectants for textile materials and industrial products of all kinds, in plant protection, in agriculture, in veterinary medicine and in cosmetics.

As examples of industrial products that can be preserved with the new benzimidazoles the following may be mentioned:

Textile assistants and improving agents, glues, binders, paints, dye and printing pastes and similar preparations based on organic or inorganic dyestuffs or pigments, including those containing as an admixture casein or other organic substances. Likewise, wall and ceiling paints, for example those which contain an albumin-based colour binder, are protected by the new compounds from infestation by pests. They may also be used for protecting timber.

Furthermore, the compounds of the Formula 1 may be used for preserving and disinfecting dressings of fibres and textile materials; they may be applied both to natural and synthetic fibres and produce on them a durable effect against harmful (including pathogenic) organisms, for example fungi and bacteria. The new benzimidazoles may be added before, together with or after a treatment of these textile materials with other substances, inter alia, for example dye or printing pastes or finishes.

Textile materials treated in this manner are also protected from the appearance of body odour caused by microorganisms.

The two benzimidazoles may also be used as preservatives in the cellulose and paper industries, inter alia, for preventing the known formation of sludge in the paper-making machines due to microorganisms.

Furthermore, when the compounds of the Formula 1 are combined with wash active or surface active substances washing and cleaning agents having excellent antibacterial and/or antimycotic effects are obtained. The benzimidazoles may be incorporated, for example, with soaps, with soap-free wash active or surface active substances or with mixtures of soaps and soap-free wash active substances, and in these combinations their antimicrobial activity is fully retained.

Aqueous preparations of these antimicrobial substances may be used for dressing textile materials, for example for rendering them antimicrobial in washing, because the active substance of the Formula 1 is capable of depositing substantively on the textile material.

Cleaning agents containing a compound of the Formula 1 may be used in industry and in the home, also in the food industry, for example in dairies, breweries or abattoirs.

The activity may also be utilized in preserving and disinfectant dressings on synthetic materials. When a plasticizer is used it is adavntageous to add the benzimidazole to the synthetic material in form of a solution or dispersion in the plasticizer. It is advantageous to ensure that the benzimidazole is distributed in the synthetic material as evenly as possible. Synthetic materials having antimicrobial properties may be used in utilitarian articles of all descriptions which are desired to have a defensive action against germs of a wide variety, for example bacteria and fungi, for example in doormats, bathroom curtains, seats, treads in swimming baths, or in wall coverings. By incorporation with wax and polishing products floor polishes and furniture polishes having a disinfectant activity are obtained.

The benzimidazoles of the Formula 1 may be applied to the textile material to be protected in various ways, for example by impregnation or spraying with solutions or suspensions containing the said compounds as active ingredient. The content of active substance may vary from 1 to 30 g. of active substance per litre of treatment liquor to suit the purpose in hand. In most cases textile materials of synthetic nature or natural origin are sufficiently protected from infestation by fungi and bacteria with a liquor containing 0.1 to 3% of the active substance. The active substance may be applied in conjunction with other textile assistants, such as dressings, anticrease finishes or the like.

The form in which the new benzimidazoles are applied may be one of the conventional formulations of pest control agents, for example agents containing a compound of the Formula 1 may further contain additives such as vehicles, solvents, diluents, dispersants, wetting agents, adhesives or the like, as well as other pest control agents. Furthermore, such preparations to be used in combating harmful microorganisms may also contain the two compounds of Formulae 2 and 3 side by side.

Parts and percentages in the following examples are by weight, unless otherwise indicated.

EXAMPLE 1

A mixture of 41.4 parts of 2-hydroxy-3,5-dichlorobenzene-1-carboxylic acid, 28.5 parts of 4-chloro-1,2-diaminobenzene and 200 parts of polyphosphoric acid is stirred under nitrogen while being heated to 195–200° C. and then, maintained at this temperature for 3 hours. The reaction mixture is then poured into 4000 parts of ice water. The precipitate formed is separated, stirred in water and the suspension is adjusted with ammonia to a pH value of about 8. After filtering and drying there are obtained about 60 parts of the compound of the Formula 2. On recrystallization from acetone-acetonitrile there are obtained about 42 parts of the pure compound which melts at 303 to 304° C.

The compound of the Formula 3, which melts at 279 to 280° C., can be manufactured in a similar manner.

EXAMPLE 2

Determination of the minimal inhibitory concentration (MIC) against fungi and bacteria Method A.—Dilution test: A 1% and a 0.3% solution each of the active substances in dimethylsulphoxide is introduced into small tubes containing brain heart infusion broth, and with these solutions dilution series are prepared in which each member has one tenth the concentration of the preceding member. By combining the two series the following continuous dilution series is obtained:

1000, 300, 100, 30, 10, 3 parts per million and so on.

The solutions are inoculated with *Staphylococcus aureus* and then incubated (in the bacteriostatic test) for 48 hours at 37° C.

After the time mentioned the minimal inhibitory concentrations in parts per million are obtained.

Method B.—Gradient plate test: X parts per million of the active substances in a suitable formulation are added to still liquid brain heart infusion agar (BHIA). This liquid mixture is poured over a basic agar nutrient layer (BHIA) without active substance, which had previously been stood up at an angle to make it solidify, and then allowed to solidify.

For inoculation the germs to be tested are applied by means of a Pasteur pipette in lines at right angles to the gradient.

After 24 hours' incubation at 37° C. the length of the germs grown on the inoculation stroke is measured and expressed in parts per million of active substance. These test methods revealed the following values:

| Test organism | Minimal inhibitory concentration (MIC) in parts per million | |
|---|---|---|
| | Compound of Formula 2 | Compound of Formula 3 |
| *Staphylococcus aureus* | (A) 0.01 | (A) 1. |
| *Streptococcus mitis* | (B) 1.5 | (B) 10. |
| *Trichophyton interdigitale* | (B) 2.3 | (B) 10. |
| *Trichophyton mentagrophytes* | (B) 1.0 | (B) 10. |
| *Paecilomyces varioti* | (B) 18 | |

Note.—(A) and (B) means measured by method (A) and (B) respectively.

EXAMPLE 3

An antibacterial soap in cake form was manufactured by adding 1.2 g. of the compound of Formula 2 to the following mixture:

| | G. |
|---|---|
| Basic soap in flake form | 120 |
| Disodium salt of ethylenediamine-tetraacetic acid (dihydrate) | 0.12 |
| Titanium dioxide | 0.24 |
| Ethyleneglycol | 6 |

The soap chips obtained by rolling were powdered in a high-speed stirrer and then pressed to form cake soap.

With the use of the antimicrobial soap a solution of 5% and 1.5% strength in sterile tap water were prepared. 1 ml. each of these solutions was added to 4 ml. of sterile brain heart infusion broth. By continuous dilution to one-tenth the previous value two series were obtained which on being combined formed the following continuous dilution series:

100, 30, 10, 3, 1 . . . parts per million of active substance.

The solutions were inoculated with cultures of *Staphylococcus aureus* and incubated for 24 hours at 37° C. After this time 0.05 ml. each was taken out of these solutions with a pipette and allowed to run over brain heart infusion slant agar. Solutions (for the bacteriostatic test) and agar tubes (for the bactericidal test) were then incubated for another 24 hours at 37° C.

The minimal inhibitory or lethal concentration respectively in parts per million of the solutions and slant agar tubes was then measured. This examination revealed the following values:

| | Effect upon *Staphylococcus aureus* in parts per million |
|---|---|
| Bacteriostatic test (48 hours) | ≤0.1 |
| Bacteriostatic test (24 hours) | ≤0.1 |

EXAMPLE 4

Specimens of 100 g. each of cotton creton were impregnated in a padder at 20° C. with a 0.1% solution of the compound of Formula 2 in dioxane or dimethylformamide and then expressed to a weight increase of 100%.

To test the antibacterial effect round discs of 10 mm. diameter of the impregnated fabrics (without watering and after an EMPA wash) were placed upon brain heart infusion agar plates previously inoculated with *Staphylococcus aureus*. The plates were then incubated for 24 hours at 37° C.

The evaluation extended, on the one hand, to the inhibitory zone (IZ in mm.) around the round discs and, on the other hand, the growth (G in percent) found microscopically under or on the fabric. Results of the test:

Without watering:
  IZ (mm.) _____ 0
  G (percent) _____ 0
After EMPA-wash:
  IZ (mm.) _____ 0
  G (percent) _____ 0

EXAMPLE 5

Sterile round discs of cotton (3.0 g.) of 4 cm. diameter are inoculated with 0.1 ml. each of a suspension of *Staphylococcus aureus* containing 50% of sterile bovine serum and $10^4$ germs and dried for 1 hour at 37° C. The discs are then washed for 15 minutes at 45° C. in a laboratory washing machine at a goods-to-liquor ratio of 1:20 with 4 g. per litre of a detergent based on dodecylbenzenesulphonate which contains 1% of the compound of Formula 2. The discs are then rinsed for 15 minutes at the same goods-to-liquor ratio at 45° C. and for 3×5 minutes at 20° C. The fabric discs are then dried between sterile filter paper.

The curative effect (washing temperature: 45° C.) is determined in the following manner:

4 discs treated with the compound of Formula 2 are placed on an agar plate each (brain heart infusion agar +0.1% yeast per litre of agar) and incubated at 37° C. After 1 hour the discs are taken off two of the plates and all 4 dishes are further incubated for 24 hours at 37° C.

The two agar plates on which the discs has been left for 1 hour are referred to as the impression plates and those on which the discs were left for 24 hours as the prolonged contact plates.

Result: Colonies of *Staphylococcus aureus* were absent from the two impression plates and from the prolonged contact plates.

We claim:
1. A benzimidazole compound of the formula

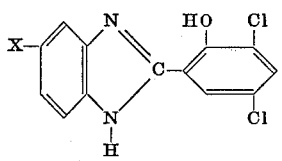

in which X represent a chlorine atom or a methyl group.
2. The compound according to claim 1 of the formula

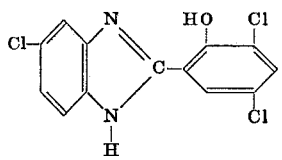

3. The compound according to claim 1 of the formula

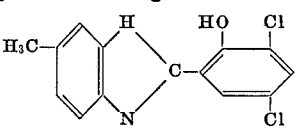

References Cited

UNITED STATES PATENTS

| | | | |
|---|---|---|---|
| 3,192,227 | 6/1965 | Brown et al. | 260—309.2 |
| 3,294,542 | 12/1966 | Süs et al. | 96—91 |

FOREIGN PATENTS

| | | | |
|---|---|---|---|
| 350,763 | 1/1961 | Switzerland | 260—309.2 |

HENRY R. JILES, Primary Examiner

G. T. TODD, Assistant Examiner

U.S. Cl. X.R.

424—273